(12) United States Patent
Engleder et al.

(10) Patent No.: US 7,780,133 B2
(45) Date of Patent: Aug. 24, 2010

(54) SUSPENDING ELEMENT

(75) Inventors: Thomas Engleder, Feldkirch-Tosters (AT); Markus Kieber, Gamprin (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/005,106

(22) Filed: Dec. 20, 2007

(65) Prior Publication Data

US 2008/0173780 A1    Jul. 24, 2008

(30) Foreign Application Priority Data

Dec. 22, 2006   (DE) .................. 10 2006 035 302

(51) Int. Cl.
*A47H 1/10* (2006.01)
(52) U.S. Cl. .......................... 248/317; 248/58
(58) Field of Classification Search ............. 248/317, 248/327, 339, 342, 58, 546, 547, 343; 411/441; 52/146, 148; 439/521, 801, 809
See application file for complete search history.

(56) References Cited

U.S. PATENT DOCUMENTS

| | | | | |
|---|---|---|---|---|
| 1,154,583 A | * | 9/1915 | Klein ..................... | 439/809 |
| 1,192,034 A | * | 7/1916 | Brisacher ................ | 439/809 |
| 1,462,187 A | * | 7/1923 | Zifferer .................. | 248/58 |
| 1,637,047 A | * | 7/1927 | Moore ................... | 248/341 |
| 1,906,673 A | * | 5/1933 | Vallee ................... | 403/201 |
| 1,948,470 A | * | 2/1934 | Lavarack ................ | 439/809 |
| 2,084,109 A | * | 6/1937 | Ribble et al. ............ | 24/135 R |
| 2,854,824 A | * | 10/1958 | Curry et al. ............ | 405/302.1 |
| 2,862,368 A | * | 12/1958 | Dempsey ............... | 405/259.3 |
| 3,957,242 A | * | 5/1976 | Holtz .................... | 248/318 |
| 5,364,053 A | * | 11/1994 | Rodgers ................. | 248/302 |
| 6,945,501 B2 | * | 9/2005 | Thompson .............. | 248/58 |
| 7,316,247 B2 | * | 1/2008 | Thompson .............. | 140/102.5 |
| 7,341,232 B2 | * | 3/2008 | Masas ................... | 248/342 |
| 2005/0056764 A1 | * | 3/2005 | Thompson .............. | 248/547 |

* cited by examiner

*Primary Examiner*—Korie Chan
(74) *Attorney, Agent, or Firm*—Abelman, Frayne & Schwab

(57) ABSTRACT

A suspending element has a wire section (12) and a support member (11) having a pot-shaped receptacle (21) for receiving an eyelet-shaped first end (15) of the wire section (12), and a clamping element (18) for securing the eyelet-shaped first end (15) of the wire section (12) in the pot-shaped receptacle (21).

14 Claims, 5 Drawing Sheets

SUSPENDING ELEMENT

BACKGROUND OF THE INVENTION

1. Field of the Invention

The present invention relates to a suspending element including a support member having a lead-in with an abutment for a fastening element, and a wire section arranged on the support member.

2. Description of the Prior Art

Suspending elements of the type described above serve, e.g., for mounting of suspended parts on constructional elements such as, e.g., ceilings or supports, and are formed of a wire section and a holding or support member for the wire section and which is secured on the constructional component, e.g., with a nail. Subsequently, a constructional part is suspended on the wire section.

U.S. Patent Publication US2005/0056764 discloses a suspending element which is formed as a ceiling hanger and in which a wire loop of a wire section is mounted on a support member. With a fastening element such as, e.g., a nail, which is insertable through a central lead-in of the support member, the suspended element can be attached to a constructional element, e.g., a ceiling. The drawback of the above-described suspending element consists in that during storage or transportation, the wire section can become detached from the support member, e.g., when the metal of the wire section becomes heated and expands. Further, the holding forces that hold the wire section on the support member, and thus, the carrying capability of the entire system are not optimal after the support member has been attached with a fastening element to a constructional element.

Accordingly, the object of the present invention is to provide a suspending element in which the above-mentioned drawback is eliminated.

Another object of the present invention is to provide a suspending element in which the wire section cannot be detached from the support member and which has a high carrying capability.

SUMMARY OF THE INVENTION

These and other objects of the present invention, which will become apparent hereinafter are achieved by providing a suspending element in which a wire section has a first end formed as an eyelet and a support member has a pot-shaped receptacle for receiving the eyelet-shaped first end of the wire section, and which includes clamping means for securing the eyelet-shaped first end of the wire section in the pot-shaped receptacle.

The annular clamping forces that act radially outwardly on the eyelet-shaped first end of the wire section, on one hand reliably prevent separation or detachment of the wire section from the support member during storage or transportation and, on the other hand, noticeably increase the holding forces of the suspending element when the suspending element is secured on the constructional component. Thus, the tensioning forces, which are needed to pull the wire section out of the support member in the mounted condition of the suspending element on a constructional component, are about 35% higher than for a conventional suspending member.

Advantageously, the clamping means includes at least one projection projecting into an inner space of the pot-shaped receptacle of the support member and engaging from behind the eyelet-shaped first end of the wire section, formlocking securing the first end. Advantageously, the at least one projection reduces, at least regionwise, a cross-section of the pot-shaped receptacle, whereby a good clamping of the first end of the wire section is achieved.

With the at least one projection formed of metal, a reliable formlocking of the eyelet-shaped first end of the wire section and an easy manufacturing of the suspending element is insured.

It is advantageous when the support member is formed of metal, e.g., sheet steel, and the clamping means is formed integrally with the support member. Thereby, the support member, together with the clamping means, can be economically produced as a sheet shaped part or a sheet deep-drawn part.

Advantageously, the at least one projection is formed after placing of the eyelet-shaped first end of the wire section in the receptacle, by shrinking.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
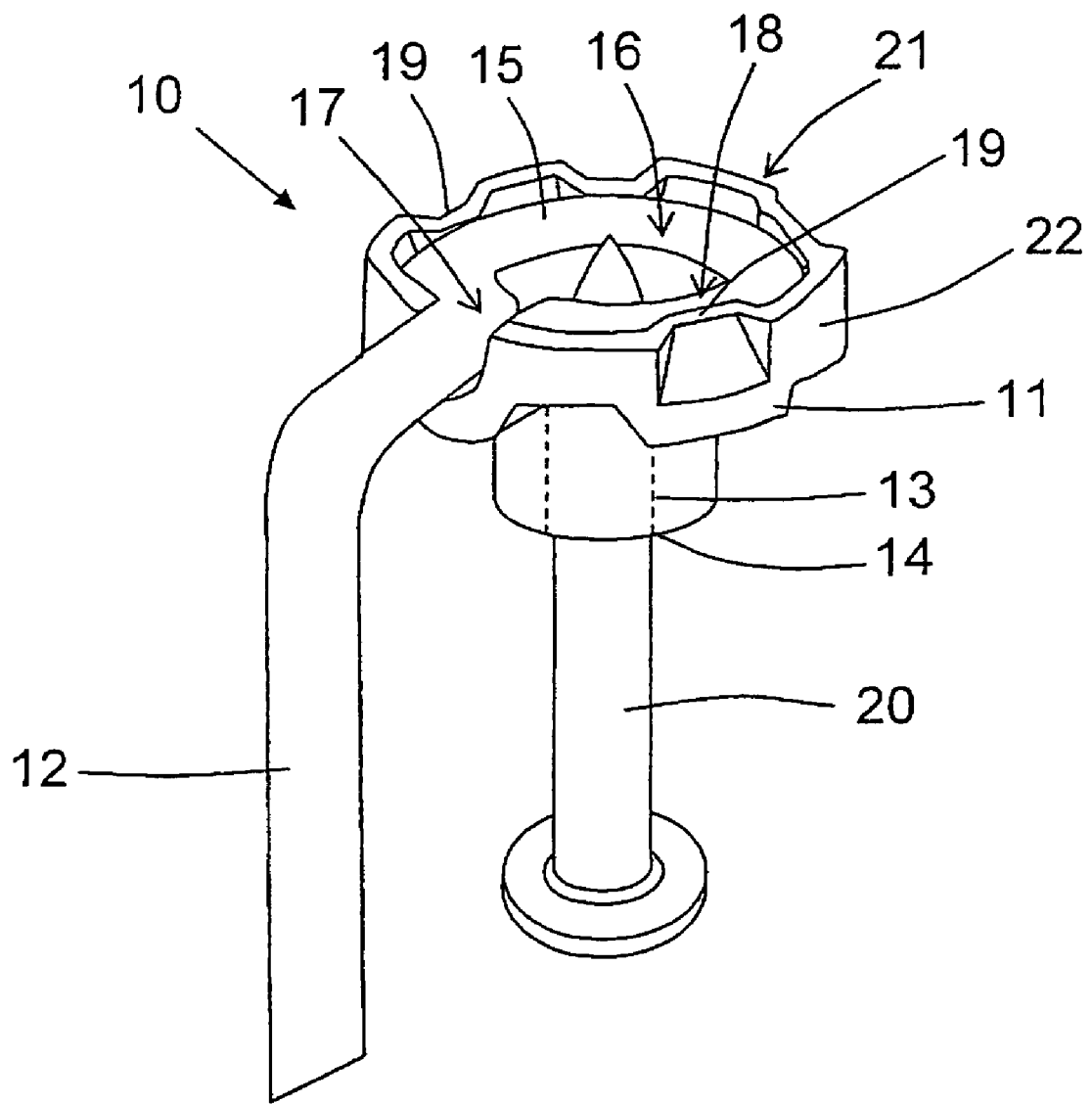
FIG. 1 an angular perspective view of a suspending element according to the present invention.
Figure 2:
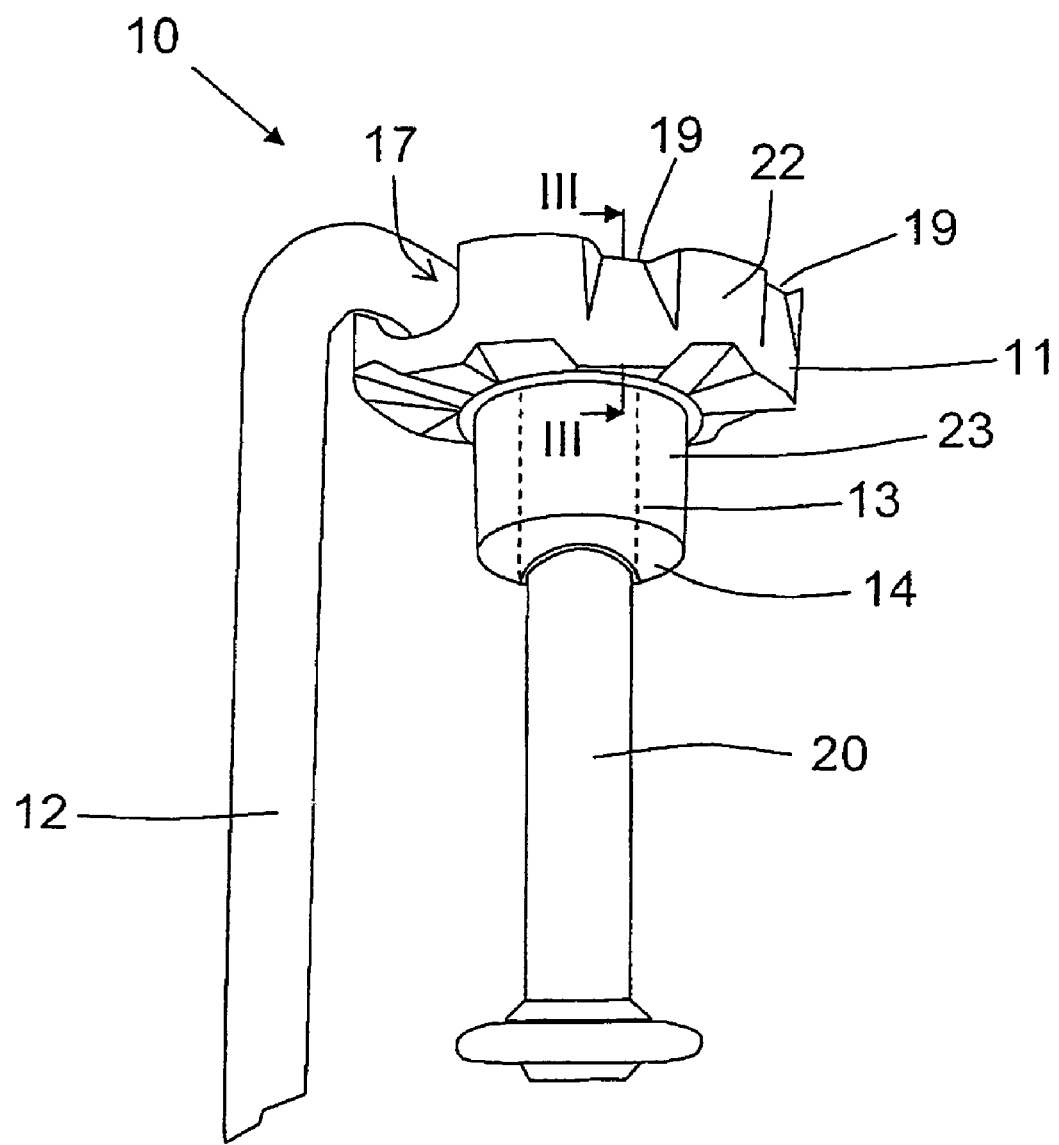
FIG. 2 a side perspective view of the suspending element shown in FIG. 1.
Figure 3:
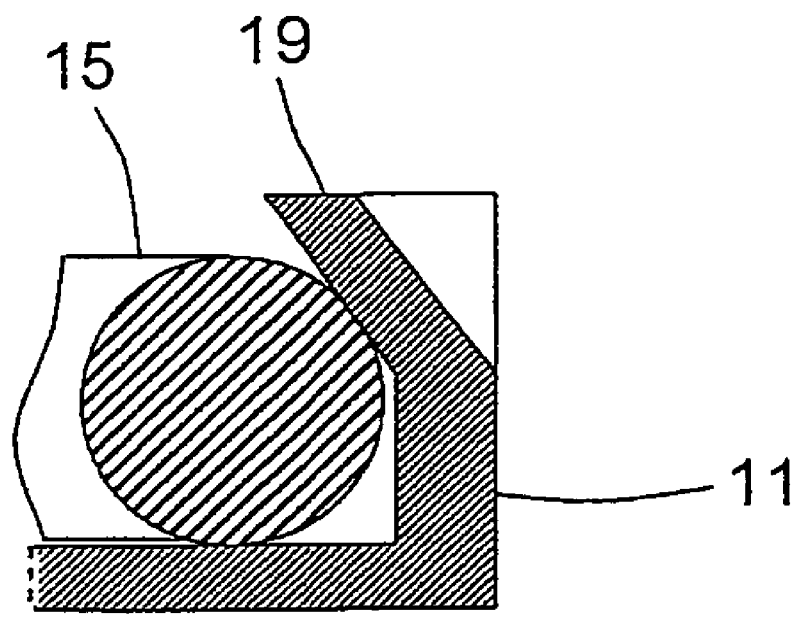
FIG. 3 a partial cross-sectional view along line II-II in FIG. 2.

FIGS. 1-3 show a suspending element 10 according to the present invention, which is formed as a ceiling suspending element, together with a fastening element 20. The suspending element 10 has a pot-shaped support member 11 with a pot-shaped receptacle 21. In the inner space 16 of the pot-shaped receptacle 21, an eyelet-shaped, bent, first end 15 of an elongate wire section 12 is formlockingly and frictionally held with clamping means 18. The eyelet-shaped first end 15 extends approximately perpendicular to the longitudinal extent of the remaining portion of the wire section 12. In a circumferential wall 22 of the pot-shaped receptacle 21, there is formed a recess 17 through which the wire section 12 extends outwardly from the inner space 16 of the pot-shaped receptacle 21 of the support member 11.

The formlocking clamping means 18 is formed by a plurality of projections 19 provided on the circumferential wall 22 and projecting into the inner space 16 of the pot-shaped receptacle 21 (see also FIG. 3). The projections 19 reduce the recess cross-section of the pot-shaped receptacle 21, at least regionwise.

Further, the eyelet, which is formed at the first end of the wire section 12 and which is open at one location, can be subjected to action of a spring force acting radially outwardly. This spring force reinforces the clamping effect of the eyelet-shaped first end 15 of the wire section 12 in the pot-shaped receptacle 21.

Instead of one or several projections 19, there can be provided, on the circumferential wall 22, a continuous, inwardly extending, bead-shaped projection that produces an almost circumferential undercut. Still further, the circumferential wall 22 can be formed in sections, i.e., be interrupted not only in the region of the recess 17 but in other locations too.

The support member 11 further has, at its side remote from the inner space 16, a sleeve member 23 on which an abutment 14 for the fastening element 20 is provided. The abutment 14 extends circumferentially about an opening of a lead-in 13 for the fastening element 20. The sleeve member 23 serves for dissipation, if necessary, of an available excessive energy during a setting process of the fastening element 20, in order to prevent damage of the suspending element 10 during an attachment process. The sleeve member 23 can be formed separately from the support member as a sleeve.

The projections 19 can be produced by shrinking, as shown, but also can be produced, e.g., by deep drawing or caulking.

Advantageously, the support member 11, the projections 19 and/or the sleeve member 23 are formed of metal such as, e.g., sheet steel. The support member 11, the projection 19, and/or the sleeve member 23 can be produced, alternatively of a high-strength plastic material.

Figure 4:
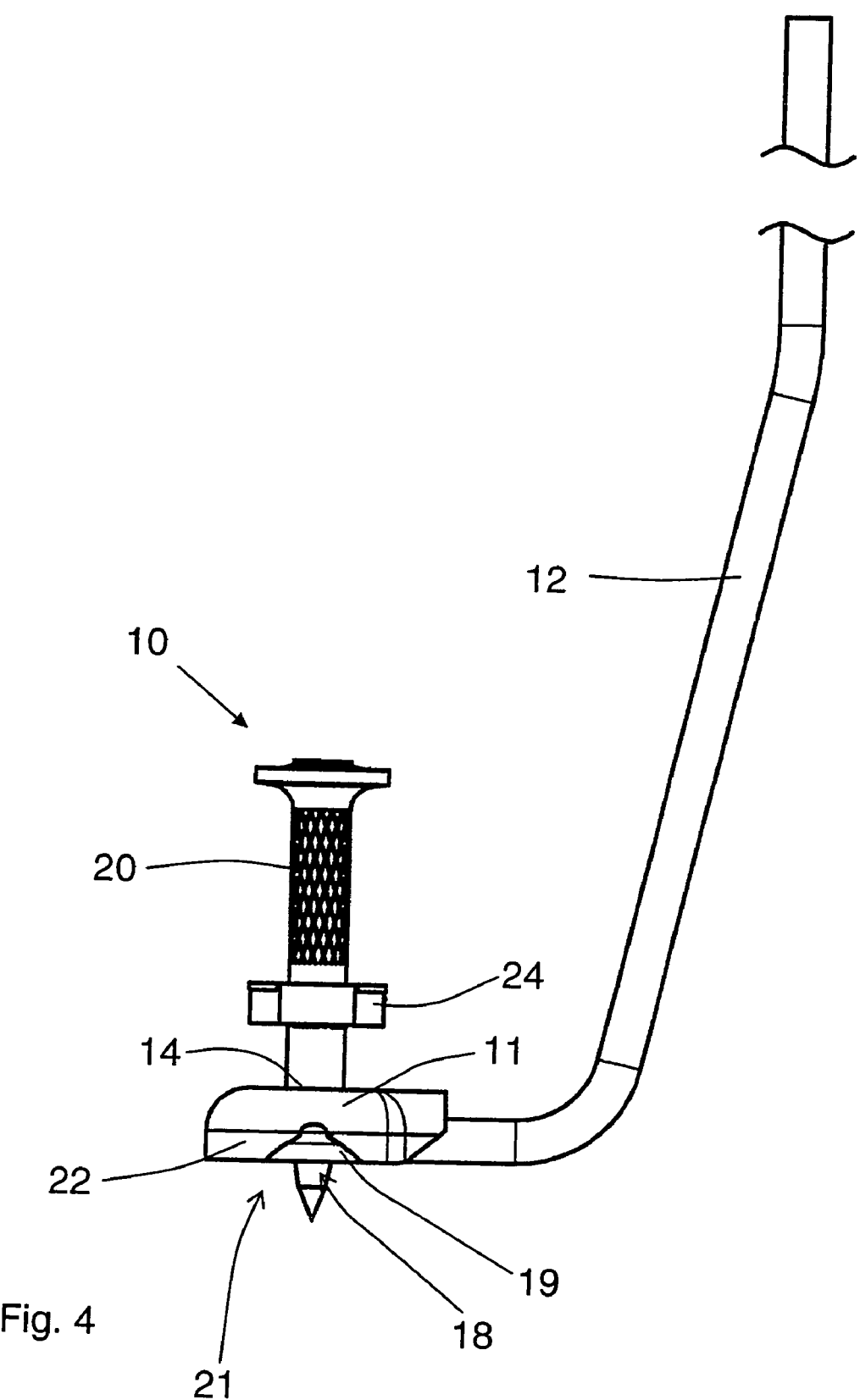
FIG. 4 a perspective view of another embodiment of a suspending element according to the present invention.
Figure 5:
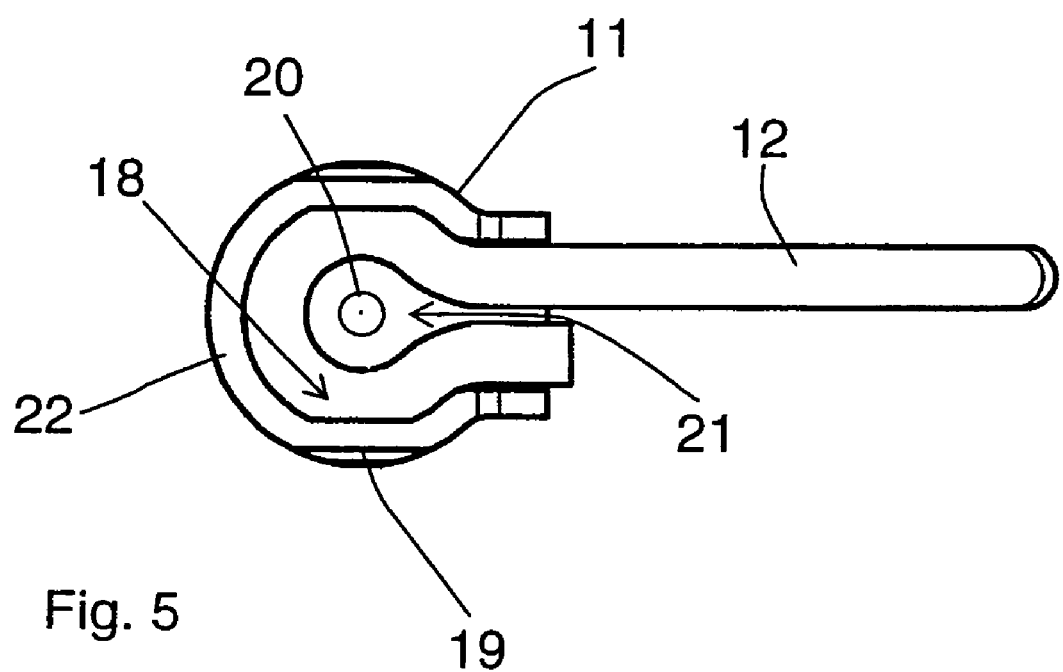
FIG. 5 a plan view of the suspending element shown in FIG. 4.

A suspending element 10, which is shown in FIGS. 4-5, distinguishes from that shown in FIGS. 1-3, in that the abutment 14 for the fastening element 23 is provided not on the sleeve member but directly on the rear side of the pot-shaped receptacle 21. On the fastening element 20, there is provided a separate sleeve member 24 which likewise serves for dissipation, if necessary, of an available excessive energy during a setting process of the fastening element 20, in order to prevent damage of the suspending element 10 during an attachment process.

Further, in the suspending element 10 shown in FIGS. 4-5, clumping means 18 are provided by precisely two projections 19, which are formed on the circumferential wall 22 and which project into the inner space 16 of the receptacle 21 (see FIG. 5), reducing the cross-section of the pot-shaped receptacle 21.

With respect to the reference numerals shown in FIGS. 4-5 but not described with reference thereto, reference should be made to the description of FIGS. 1 through 3 in its entirety.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An element for suspending an object from a ceiling, comprising a fastening element (20) for securing the suspending element to the ceiling;
    a wire section (12) for supporting the suspended object and having one end thereof formed as an eyelet (15), wherein the eyelet-shaped end (15) of the wire section (12) is subjected to a spring force acting radially outwardly;
    a support member (11) for supporting the wire section (12) and having a pot-shaped receptacle (21) for receiving the eyelet-shaped end (15) of the wire section (12) and having a recess (17 in a circumferential wall (22) thereof through which the wire section (12) is extendable;
    a lead-in (13) for the fastening element (20) and having an abutment (14) functioning as a stop for the fastening element (20) during an attachment of the suspending element to the ceiling; and
    clamping means for securing the eyelet-shaped end (15) of the wire section (12) in the pot-shaped receptacle (21).

2. A suspending element according to claim 1, wherein the clamping means (18) comprises at least one projection (19) projecting into an inner space (16) of the pot-shaped receptacle (21) of the support member (11) for securing the eyelet-shaped end (15) in the inner space.

3. A suspending element according to claim 2, wherein the at least one projection (19) reduces, at least regionwise, a cross-section of the pot-shaped receptacle (21).

4. A suspending element according to claim 2, wherein the at least one projection (19) is formed of metal.

5. A suspending element according to claim 2, wherein the at least one projection (19) is formed by shrinking.

6. A suspending element according to claim 1, wherein the support member (11) is formed of metal, and the clamping means (18) is formed integrally with the support member (11).

7. A suspending element according to claim 1, wherein the eyelet-shaped first end (15) of the wire section (12) is completely received in the pot-shaped receptacle (21) and defines, together with the pot-shaped receptacle (21), respectively, planes which are coplanar.

8. A suspending element according to claim 1, wherein the clamping means comprises a continuous bead-shaped projection projecting into an inner space (16) of the pot-shaped receptacle (21) of the support member (11) for securing the eyelet-shaped end (15) in the inner space.

9. A suspending element according to claim 1, further comprising a separate sleeve member (24) forming the lead-in (13).

10. An element for suspending an object from a ceiling, comprising a wire section (12) for supporting the suspended object and having one end thereof formed as an eyelet (15), wherein the eyelet-shaped end (15) of the wire section (12) is subjected to a spring force acting radially outwardly; and
    a support member (11) for supporting the wire section (12) and having a pot-shaped receptacle (21) in an inner space of which the eyelet-shaped end (15) of the wire section (12), is received, the pot-shaped receptacle (21) having a recess (17) in circumferential wall (22) thereof through which the wire section (12) is extendable, and at least one projections projecting in the inner space of the pot-shaped receptacle (21) for engaging the eyelet-shaped end (15) for securing the eyelet-shaped end (15) in the inner space; and
    a lead-in (13) for receiving a fastening element (20) that secures the suspending element to the ceiling.

11. A suspending element according to claim 10 wherein the lead-in (13) has an abutment (14) functioning as a stop for the fastening element.

12. A suspending element according to claim 10, wherein the pot-shaped receptacle (21) has an open top side for abutting the ceiling, and the eyelet-shaped end of the wire section is enclosed between the pot-shaped receptacle and the ceiling.

13. A suspending element according to claim 10, wherein the at least one projection comprises a continuous bead-shaped projection projecting into an inner space (16) of the pot-shaped receptacle (21) of the support member (11) for securing the eyelet-shaped end (15 in the inner space.

14. A suspending element according to claim 10, further comprising a separate sleeve member (24) forming the lead-in (13).

* * * * *